(12) United States Patent
Price et al.

(10) Patent No.: US 12,259,467 B2
(45) Date of Patent: Mar. 25, 2025

(54) TERRAIN REFERENCED NAVIGATION SYSTEM

(71) Applicant: Atlantic Inertial Systems Limited, Plymouth (GB)

(72) Inventors: Andrew Price, Plympton (GB); Geoffrey Henderson, Yelverton (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 488 days.

(21) Appl. No.: 17/506,903

(22) Filed: Oct. 21, 2021

(65) Prior Publication Data

US 2022/0128686 A1    Apr. 28, 2022

(30) Foreign Application Priority Data

Oct. 23, 2020   (EP) ..................... 20275164

(51) Int. Cl.
| | | |
|---|---|---|
| *G01S 13/931* | (2020.01) | |
| *G01S 19/47* | (2010.01) | |
| *G01S 19/51* | (2010.01) | |

(52) U.S. Cl.
CPC ............ *G01S 13/931* (2013.01); *G01S 19/47* (2013.01); *G01S 19/51* (2013.01); *G01S 2013/932* (2020.01)

(58) Field of Classification Search
CPC ........ G01S 13/931; G01S 19/47; G01S 19/51; G01S 2013/932; G01C 21/20;
(Continued)

(56) References Cited

U.S. PATENT DOCUMENTS

| | | | | |
|---|---|---|---|---|
| 3,659,085 A | * | 4/1972 | Potter ................... | G01S 5/0244 701/518 |
| 5,331,562 A | * | 7/1994 | McGuffin ............. | G01C 21/005 342/63 |

(Continued)

FOREIGN PATENT DOCUMENTS

CN    106297416 A    1/2017

OTHER PUBLICATIONS

Extended European Search Report for International Application No. 20275164.0 dated Mar. 31, 2021, 6 pages.
Translation of CN106297416A, 4 pages.

*Primary Examiner* — Aniss Chad
*Assistant Examiner* — Chase L Cooley
(74) *Attorney, Agent, or Firm* — CANTOR COLBURN LLP (57) ABSTRACT

A terrain referenced navigation system includes a one sensor arranged to measure the elevation of terrain below a current position of the navigation system, a terrain elevation map comprising a plurality of map posts that each comprise terrain elevation data, and a land-water detection unit arranged to calculate a proportion of land and/or water of at least a portion of the terrain elevation map based on the terrain elevation data of said portion of said terrain elevation map. The land-water detection unit provides the ability to estimate a proportion of land and/or water of the terrain elevation map, using the terrain elevation data stored therein. The land-water detection unit allows the navigation system to detect areas of the map that contain transitions between land and water, and compensate accordingly when passing over these areas.

13 Claims, 5 Drawing Sheets

(58) Field of Classification Search
CPC .. G01C 21/005; G01C 21/3826; G01C 5/005; G01C 21/165; G01C 21/3848; G01C 21/3859
See application file for complete search history.

(56) References Cited

U.S. PATENT DOCUMENTS

| | | | |
|---|---|---|---|
| 5,335,181 A | 8/1994 | McGuffin | |
| 8,788,128 B1* | 7/2014 | McCusker | G01S 13/935 |
| | | | 701/4 |
| 2008/0298636 A1* | 12/2008 | Rasheed | G06T 7/215 |
| | | | 382/103 |
| 2018/0130193 A1* | 5/2018 | Mithal | G06V 10/44 |
| 2019/0368879 A1* | 12/2019 | Roumeliotis | G07C 5/08 |

* cited by examiner

TERRAIN REFERENCED NAVIGATION SYSTEM

CROSS-REFERENCE TO RELATED APPLICATIONS

This application claims priority to European Patent Application No. 20275164.0 filed Oct. 23, 2020, the entire contents of which is incorporated herein by reference.

TECHNICAL FIELD

The present disclosure relates to the field of terrain referenced navigation systems. More particularly, this disclosure relates to the detection of land/water transitions in terrain referenced navigation systems.

BACKGROUND

Terrain Referenced Navigation (TRN) systems are in service on a number of airborne platforms and integrate aircraft navigation data, radar altimeter data and stored terrain elevation data in order to generate a navigation solution. TRN systems are often used in conjunction with Inertial Navigation Systems (INS), which use inertial measurement sensors (e.g. gyroscopes, accelerometers, etc.) to provide a navigation solution. Such systems are sometimes referred to as Inertial Reference Units (IRUs). The navigation solutions often use INS error calibrating Kalman Filters as a means of integrating the navigation solutions provided by the TRN and the INS.

Position estimates obtained from Inertial Navigation Systems typically drift at a rate of around 2 nautical miles per hour due to the accumulation of errors caused by accelerometers and gyroscopes over time. Navigation systems are able to correct for these errors, to an extent, by using further sources of position estimates, including satellite-based navigation solutions such as GPS, GNSS, etc. However, satellite-based navigation solutions are not reliable: signals can be jammed, spoofed, blocked, etc. which can lead to problems with navigation systems that rely too heavily on these satellite-based navigation solutions. TRN systems offer a further navigation solution that can allow navigation systems to correct for INS errors over time.

Conventional TRN systems utilise Barometric-Inertial mixed altitude and radar altimeters in order to estimate terrain elevation beneath an aircraft. Measured terrain elevation estimates are then correlated with terrain elevation data, stored in a terrain elevation map, along the aircraft's travel path in order to produce a navigation solution—i.e. estimate the position of the aircraft.

SUMMARY

When viewed from a first aspect this disclosure provides a terrain referenced navigation system comprising: at least one sensor arranged to measure the elevation of terrain below a current position of the navigation system; a terrain elevation map comprising a plurality of map posts that each comprise terrain elevation data; and a land-water detection unit arranged to calculate a proportion of land and/or water of at least a portion of the terrain elevation map based on the terrain elevation data of said portion of said terrain elevation map.

Terrain maps typically store a fixed elevation for each entry, including entries that correspond to both areas of land and areas of water on the surface of the Earth. The elevation of bodies of water, however, rises and falls over time (e.g. as a result of tides, seasonal filling and evaporation of lakes, etc.). This can cause the actual elevation of water to differ from stored elevation values in the terrain map, which can cause errors in position estimates obtained from terrain-referenced navigation systems when such systems try to correlate the measurements of actual height with the stored map heights.

The effect of inaccurate terrain elevation data over areas of water is particularly problematic over areas of transitions between land and water. When an aircraft equipped with a terrain referenced navigation system passes from land to water (or vice versa), the measured difference in elevation across the transition can differ from the expected difference in elevation based on the stored elevation values in the terrain elevation map. The discrepancy between the actual and expected values may be a number of meters. In practice, this can lead to the TRN outputting inaccurate position estimates and/or state error estimates (e.g. of position, velocity, attitude, etc.), as it may assume that the measured data is correct and therefore fail to correlate the aircraft's position with the correct position on the map (either matching to an incorrect position or making no match at all). This can lead to sharp spikes in navigation error over transitions between land and water. The TRN system disclosed herein comprises a land-water detection unit, which provides the ability for the navigation system to estimate a proportion of land and/or water of a portion of the terrain elevation map, using the terrain elevation data stored therein. The land-water detection unit allows the navigation system to detect areas of the terrain map that contain transitions between land and water, and allows the TRN system to compensate accordingly when passing over these areas, thereby reducing the effect of these transitions on navigational error.

In a set of examples, the navigation system further comprises: an iterative algorithm unit arranged to determine a position estimate of the navigation system, wherein in each iteration the iterative algorithm unit is arranged to: receive the measured terrain elevation data; receive the proportion of land and/or water of at least a portion of the terrain elevation map from the land-water detection unit; determine whether the current position estimate of the navigation system is over a land-water transition based on the proportion of land and/or water received from the land-water detection unit; and update the position estimate for the next iteration based on the current position estimate, the measured terrain elevation data, the stored terrain elevation data and whether the current position estimate of the navigation system is over a land-water transition. Iterative algorithms are often used in navigation systems to take various observations and/or estimates and combine them into an optimal solution. Examples of such iterative algorithms include least squares estimators such as Kalman filters. By taking into account the extra information on the presence of a land-water transition, the iterative algorithm unit can provide an improved estimate of position. In particular, the presence or absence of a land-water transition may be used to change the way in which the other information is combined or processed to form the optimal solution.

The iterative algorithm unit may be arranged to update the position estimate for the next iteration based on a correlation between measured terrain elevation data and stored terrain elevation data in the terrain elevation map. In a set of examples, the terrain referenced navigation system (TRN) further comprises an inertial navigation system (INS), and the iterative algorithm unit is arranged to update the position estimate for the next iteration based further on the signal(s)

output by the INS. This provides additional input that the iterative algorithm unit can take into account when updating the position estimate for the next iteration, allowing the terrain referenced navigation system to produce a more accurate navigation solution. In some examples, the INS can produce a position estimate that is independent of a purely terrain based position estimate. In such examples the INS produces its position estimate based on integrating the outputs of the IMU (accelerometers and gyros) over time while the purely terrain based position estimate is produced by correlating measurements of the terrain elevation with the stored map of terrain elevation to give a best estimate of current position. In practice, both of these position estimates may be calculated and combined by the IAU based on inputs from the INS, the stored map of terrain elevation and the terrain elevation sensors. The way in which these two estimates are combined is determined by the iterative algorithm unit which may adjust its optimal solution based on the changes and the reliability of each estimate. Where a land-water transition is detected, the iterative algorithm unit may place less reliance on current measurements as the TRN estimate could be thrown off by an unexpected water level in such areas. Accordingly, the IAU effectively treats the unexpected water level as being of lower significance and does not adjust its optimal position solution so much in response to that unexpected water level.

In a set of examples, the iterative algorithm unit is arranged to update the position estimate for the next iteration based on whether the current position estimate (i.e. the estimate of the previous iteration) is located above a land-water transition by increasing the uncertainty associated with the measured terrain elevation data. In doing so, the iterative algorithm unit effectively assumes that the measured terrain elevation data has a larger error than has been calculated by the normal mechanisms when it is over areas of transition between land and water. This forces the iterative algorithm unit to update the position estimate for the next iteration based more heavily on other sources of navigation (e.g. an INS) when passing over land-water transitions, and thus helps prevent navigation errors caused by discrepancies between measured elevation data and stored elevation data of areas of water. By increasing the uncertainty associated with the measured terrain elevation data, any discrepancy between the measured data and the stored map data is more likely to be within the expected uncertainty and is therefore less likely to cause errors within the iterative algorithm unit. The iterative algorithm is more likely to remain convergent in such circumstances.

In a set of examples, the iterative algorithm unit comprises a Kalman filter. The iterative algorithm unit may be arranged to de-weight the measured terrain elevation data by increasing the modelled uncertainty of its knowledge of a height state (also known to those skilled in the art as a "Q"-boost) of the iterative algorithm unit when the iterative algorithm unit determines that the navigation system is located above a land-water transition. Iterative algorithm units, such as Kalman filters, typically utilise a "P"-matrix which holds the covariances of the error estimates of each available system state variable. Iterative algorithm units also typically utilise a "Q"-matrix which holds levels of uncertainty that are added to the P-matrix on each propagation cycle in order to model system noise and other effects. The state vector may include one or more height error states, with their associated entries in the P and Q matrices. The height states are therefore associated with the measured terrain elevation data as this is calculated based on height measurements taken by at least one sensor of the navigation system. By adding this theoretical noise to a state, the iterative algorithm unit assumes that said state has a larger error than it would without applying the Q-boost, and therefore does not take measurements associated with the state into account as strongly as other measurements when updating the position estimate for the next iteration. In other words, the iterative algorithm unit increases the uncertainty associated with (or reduces the weight of) the measurements associated with the height state (i.e. the measured terrain elevation data) when updating the position estimate for the next iteration. When referring to weights (or de-weighting), it will be appreciated that the various pieces of information may be combined together with weighting coefficients that indicate their respective importance or accuracy. One way to do this is to weight the measurements according to their estimated uncertainties, with more uncertain measurements given less weight than those with lower uncertainties.

In a set of examples, the iterative algorithm unit is arranged to apply a Q-boost equal to a predetermined amount to the height state of the iterative algorithm unit when it determines that the navigation system is located above a land-water transition. In some examples the predetermined value may be greater than $(0.5\ m)^2$, preferably greater than $(1\ m)^2$, more preferably greater than $(2\ m)^2$, yet more preferably greater than $(3\ m)^2$.

In a set of examples, the iterative algorithm unit is arranged to apply a Q-boost equal to an amount dynamically determined by the iterative algorithm based on other variables. Such variables may include local gradients, tide times, flight phase, etc.

In a set of examples, the portion of the terrain elevation map for which the land-water detection unit calculates a proportion of land or water comprises a number of map posts (i.e. individual location data points) corresponding to an area surrounding (and optionally centred on) the current estimated position of the navigation system. The size and shape of the area for which the land-water detection unit calculates a proportion of land or water, and therefore the corresponding number of map posts, may depend upon the uncertainty in the current position estimate. The portion of the terrain elevation map for which the land-water detection unit calculates a proportion of land or water may comprise a subset of a larger cache comprising a predetermined number of map posts corresponding to an area surrounding the current position estimate.

Many different algorithms could be used to determine from the terrain elevation map which map posts are likely to be land and which are likely to be water. However, in a set of examples, the land-water detection unit is arranged to classify a map post as probably land or probably water of at least a portion of the terrain elevation map that may comprise an area of less than 40000 (e.g. 200 by 200) map posts, preferably an area of less than 10000 (e.g. 100 by 100) map posts, more preferably an area of less than 2500 (e.g. 50 by 50) map posts, yet more preferably an area of less than or equal to 1000 (e.g. 30 by 30) map posts. In some embodiments, each map post comprises terrain elevation data for an area of less than 40000 m2 (e.g. 200 m by 200 m) on the Earth's surface, preferably an area of less than 10000 m2 (e.g. 100 m by 100 m), more preferably an area of less than 2500 m2 (e.g. 50 m by 50 m), yet more preferably an area of less than or equal to 1000 m2 (e.g. 30 m by 30 m). It will be appreciated that there is a trade-off between the resolution of the data points, the number of data points, the accuracy of the classification process and the processing power required to perform the correlation process.

In a set of examples, the land-water detection unit is arranged to classify each map post as land or water for a portion of the terrain elevation map, the process of classifying each map post as land or water comprising: initially labelling as water all map posts within the portion of the terrain elevation map; changing to land the labels of all map posts that have an adjacent map post at a lower elevation in a first pass of the map posts within the portion of the terrain elevation map; and in repeated passes, changing to land the labels of all map posts that have an adjacent map post at the same elevation that is labelled as land, ceasing at the end of the first pass that results in no labels being changed. This algorithm allows the land-water detection unit to classify as land or water a portion of the terrain elevation map using only the terrain elevation data stored therein, enabling the land-water detection unit to be compatible with a variety of different existing terrain elevation maps, e.g. DTED (Digital Terrain Elevation Data), DTED2, etc., as the unit simply requires terrain elevation data to function. This algorithm operates on the principle that water generally flows down slopes to the lowest possible position. Therefore a local minimum in the terrain may be considered to be water. Any map post that has an adjacent map post that is at a lower elevation can be safely assumed to be land as it is at an upper region of a slope such that water would flow down it. Once all the sloping land has been categorized this way, any terrain that is at the same height as adjacent land can also be assumed to be land as the local water level has been established as being lower. Whatever remains is then assumed to be water. This approach may detect some small flat areas of land (e.g. a flat valley floor) as water, but it will reliably detect genuine areas of water. Being able to detect and compensate for the actual land-water transitions is of great benefit while the occasional increased error that may be associated with small flat areas of land (because they are incorrectly identified as water) has been found to have little detrimental effect on the accuracy of the system.

It may be noted that the theory of identifying a map post as land when there is a lower adjacent post may fall down for large flowing rivers and waterfalls. However, in practice this is not a problem. The disclosure is mainly concerned with identification of boundaries at larger relatively static bodies of water such as lakes, seas, reservoirs, etc. Also, the database creators typically put an artificial lip of height 1 metre around bodies of water where there is no higher terrain (e.g. at the top of a waterfall) such that the algorithm would still function correctly.

In a set of examples, the land-water detection unit is arranged to: classify each map post as land or water for a first portion of the terrain elevation map corresponding to a predetermined area surrounding the current position estimate; and calculate a proportion of land and/or water of a second portion of the terrain elevation map corresponding to a second area surrounding the current position estimate, wherein the second portion of the terrain elevation map is a subset of the first portion. The first portion of the terrain elevation map over which the land/water classification is performed may be cached for ease of access.

In a set of examples the iterative algorithm unit is arranged to determine that the navigation system is located above a transition between land and water when the proportion of map posts within the second portion of the terrain elevation map that are labelled as land lies above a first predetermined threshold and below a second predetermined threshold, and to determine that the navigation system is not located above a land-water transition when the proportion of said map posts that are labelled as land does not lie above said first predetermined threshold and below said second predetermined threshold. It will be appreciated that the same process may be used with the proportion of water instead of the proportion of land. In some examples the first predetermined threshold is less than or equal to 20%, preferably less than or equal to 15%, more preferably less than or equal to 10%, yet more preferably less than or equal to 5%. In some examples the second predetermined threshold is greater than or equal to 80%, preferably greater than or equal to 85%, more preferably greater than or equal to 90%, more preferably greater than or equal to 95%. Such values for the first predetermined threshold and the second predetermined threshold allow transitions between land and water to be easily detected whilst reducing the occurrence of false detections of land-water transitions.

It will be appreciated that the determination of a map post as land or water could be calculated in advance for the whole of, or a large portion of the terrain map, with the labels being stored alongside the elevation data for swift reference. However, modifying the map data may complicate matters from a software and regulatory perspective and therefore it is advantageous in certain examples to keep the standard terrain map unchanged and to calculate the land and water labels (and thus the land-water transitions) in real time on the cached portion of the terrain map that is currently in use for terrain based navigation (i.e. for position estimation). This cached portion is updated in a rolling manner as the position changes with new map points being loaded into the cache from the terrain map as the vehicle moves over new (uncached) terrain, while older map points are discarded when no longer needed (when the vehicle moves sufficiently far from those map points).

When viewed from a second aspect the present disclosure provides a method of calculating a proportion of land and/or water of at least a portion of a terrain elevation map comprising a plurality of map posts that each comprise terrain elevation data, the method comprising: initially labelling as water all map posts within the portion of the terrain elevation map; changing to land the labels of all map posts that have an adjacent map post at a lower elevation; changing to land the labels of all map posts that have an adjacent map post at the same elevation that is labelled as land; and calculating the proportion of map posts that are labelled as land and/or water within the portion of the terrain elevation map.

When viewed from a third aspect the present disclosure provides a method of classifying each map post as land or water of a portion of a terrain elevation map, the terrain elevation map comprising a plurality of map posts that each comprise terrain elevation data, the method comprising: initially labelling as water all map posts within the portion of the terrain elevation map; changing to land the labels of all map posts that have an adjacent map post at a lower elevation in a first pass of the map posts within the portion of the terrain elevation map; and in repeated passes, changing to land the labels of all map posts that have an adjacent map post at the same elevation that is labelled as land, ceasing at the end of the first pass that results in no labels being changed.

It will be appreciated that all of the optional features described above in relation to the first aspect of the disclosure may also apply equally to the second aspect.

BRIEF DESCRIPTION OF THE DRAWINGS

One or more non-limiting examples will now be described, with reference to the accompanying drawings in which.

DETAILED DESCRIPTION OF THE DRAWINGS

Figure 1:
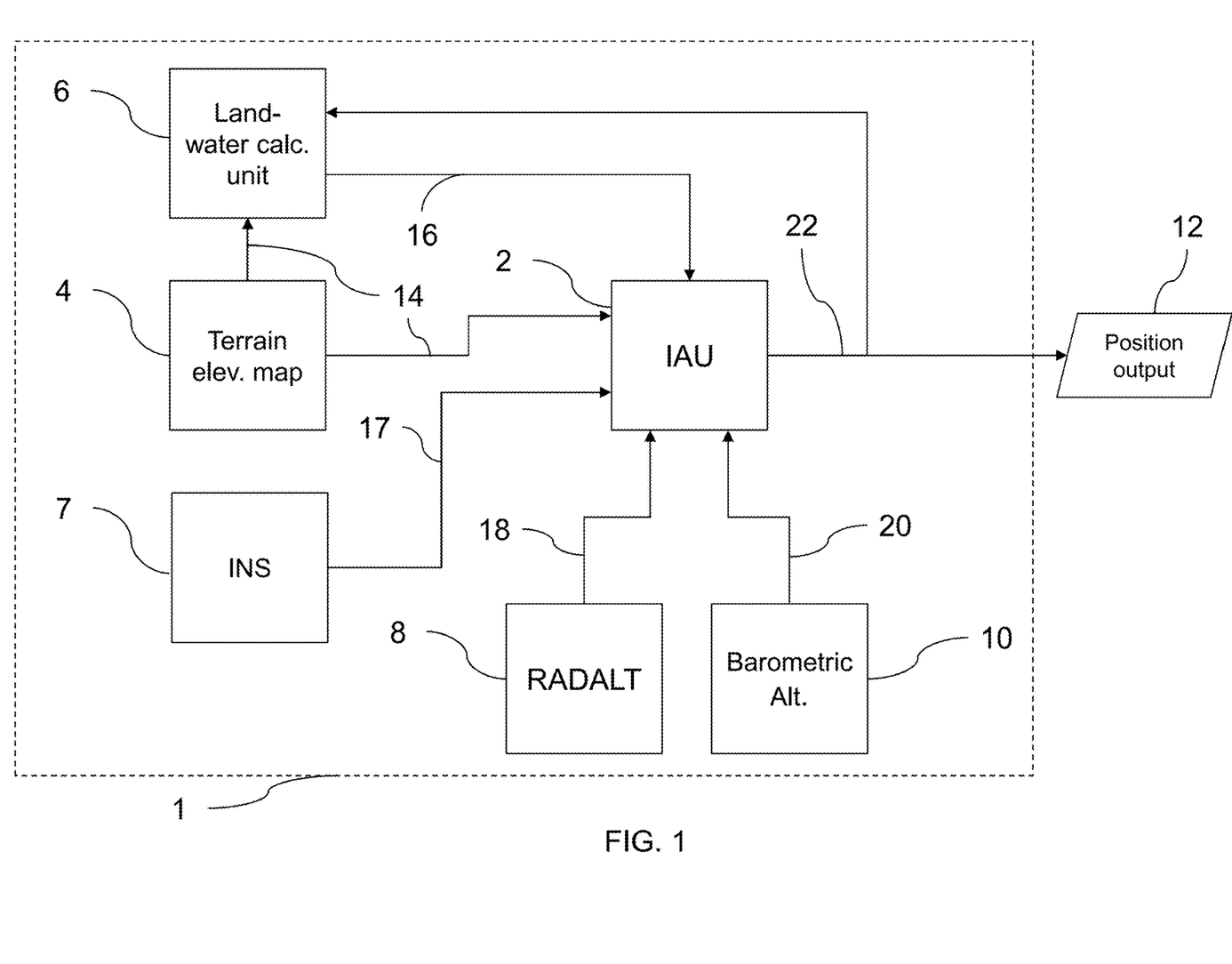
FIG. 1 shows a schematic block diagram of a navigation system in accordance with the present disclosure.

FIG. 1 schematically shows a navigation system 1. The navigation system 1 is suitable for a vehicle such as an aeroplane, a helicopter, etc. The navigation system 1 shown in FIG. 1 comprises an iterative algorithm unit (IAU) 2, a terrain elevation map 4, a land-water calculation unit 6, an inertial navigation system (INS) 7, a radar altimeter (RADALT) 8 and a barometric altimeter 10. The IAU 2 uses inputs from the terrain elevation map 4, the land-water calculation unit 6, the INS 7, the RADALT 8 and the barometric altimeter 10 to derive an estimate of the vehicle's current position 22, which it then outputs as the position output 12. The position output 12 may comprise a further system of a vehicle to which the navigation system 1 is attached, e.g. a navigation display, an autopilot system, a flight recording system, etc.

The terrain elevation map 4 comprises a plurality of map posts, each map post comprising terrain elevation data (i.e. a height above sea level) for an area on the Earth's surface. In this example, each map post comprises terrain elevation data for an area of 30 m by 30 m on the Earth's surface. The terrain elevation map 4 may be stored using any appropriate non-volatile storage means, including but not limited to hard-disk drives (HDD), solid state drives (SSD), etc. The terrain elevation map 4 is arranged to output terrain elevation data 14 to both the IAU 2 and the land-water calculation unit 6. The terrain elevation map 4 may be arranged to output local terrain elevation data 14 to the IAU 2 and the land-water calculation unit 6 according to the current estimated position of the vehicle 22.

The INS 7 comprises one or more inertial measurement units, for example accelerometers and gyroscopes, which measure the motion of the vehicle to which the navigation system 1 is attached in order to allow a position estimate to be calculated. In this example, the INS 7 comprises three orthogonal accelerometers and three orthogonal gyroscopes. The INS 7 outputs the measurements obtained using these accelerometers and gyroscopes to the IAU 2, in the form of INS measurements 17. The INS measurements 17 may comprise the signals as output by the accelerometers and gyroscopes, or a sequence of digital samples of the outputs of each of the accelerometers and gyroscopes.

The radar altimeter 8 comprises a radar system arranged to measure the distance between the vehicle and the ground beneath it at any one time. In this example, the radar altimeter 8 uses time of flight measurements of radio waves emitted from antennas aboard the vehicle and detected at the vehicle after reflection off of the ground's surface. The radar altimeter 8 outputs measurements 18 of the vehicle's height above the ground to the IAU 2.

The barometric altimeter 10 comprises an air pressure sensor (barometer) arranged to measure the air pressure over time. While the barometric altimeter may output these measurements directly to the IAU 2, in this example it is arranged to output an estimate of the vehicle's altitude 20 (i.e. height above sea level) to the IAU, calculated using the air pressure measurements.

The land-water calculation unit 6 is arranged to classify map posts for a region of the terrain elevation map 4 as land or water, and to calculate a proportion of land and/or water from the classifications of map posts for a region surrounding the current estimated position of the vehicle 22. The land-water calculation unit 6 is arranged to output at 16 a proportion of map posts that are labelled as land for a region surrounding the current estimated position of the vehicle 22 to the IAU 2. The land-water calculation unit 6 receives the current estimated position 22 from the IAU 2, which it uses to calculate which map posts of the terrain map 4 correspond to the region surrounding the current estimated position 22. The operation of the land-water calculation unit 6 will be described in further detail with reference to FIGS. 3 to 5.

In this example, the IAU 2 comprises a Kalman filter, arranged to iteratively update a system error state which comprises estimates of errors for a plurality of system variables, including, for example, a height state, a pitch state, a yaw state, a roll state, etc. The IAU 2 is arranged to iteratively update the system error state according to inputs from the terrain elevation map 4, the land-water calculation unit 6, the INS 7, the radar altimeter 8 and the barometric altimeter 10, and output a current position estimate 22 based on the current system state and the position estimate of the previous iteration, using variations on standard Kalman filter algorithms which are well known in the art. In this example, the IAU 2 holds a "P"-matrix which holds the covariances of the error estimates of each available system state variable, as well as a "Q"-matrix which holds levels of uncertainty that are added to the P-matrix on each iteration in order to model system noise and other effects. When the IAU 2 increases a value within the Q-matrix corresponding to a system state variable, the corresponding error within the P-matrix increases accordingly to take this into account. In other words, the IAU 2 is able to apply a "Q-boost" to the estimated error of a particular state variable stored within the P-matrix in order to cause the IAU 2 to apply less weight to measurements corresponding to that state variable when updating the system error state and position estimate, In this example, the IAU 2 is arranged to calculate a terrain-based position estimate which it uses to update the system error state and the position estimate 22 for the next iteration. The IAU 2 calculates the terrain-based position estimate by correlating estimates of terrain elevation obtained using measurements from the radar altimeter 8, barometric altimeter 10 and INS 7. More specifically, the IAU 2 calculates a barometric-inertial mixed altitude by combining measurements from the INS 7 and from the barometric altimeter 10, the barometric-inertial mixed altitude comprising an estimate of the vehicles altitude (i.e height above sea level) at any given time. The IAU 2 then subtracts measurements of the vehicle's height above the ground beneath it obtained from the radar altimeter 8 from the barometric-inertial mixed altitude in order to obtain an estimate of the terrain height beneath the vehicle. By doing this over a period of time, the IAU 2 is able to calculate a track of terrain height measurements. The IAU 2 is arranged to correlate the track of terrain height measurements with the local terrain elevation data 14, obtained from the terrain elevation map 4, and use said correlation in order to provide a more accurate position estimate 22 in each iteration. In particular, by performing this correlation between measurements of terrain height and stored terrain elevation data, the position estimate of the vehicle output by the IAU 2 is subjected to a lower level of drift over time.

Figure 2:
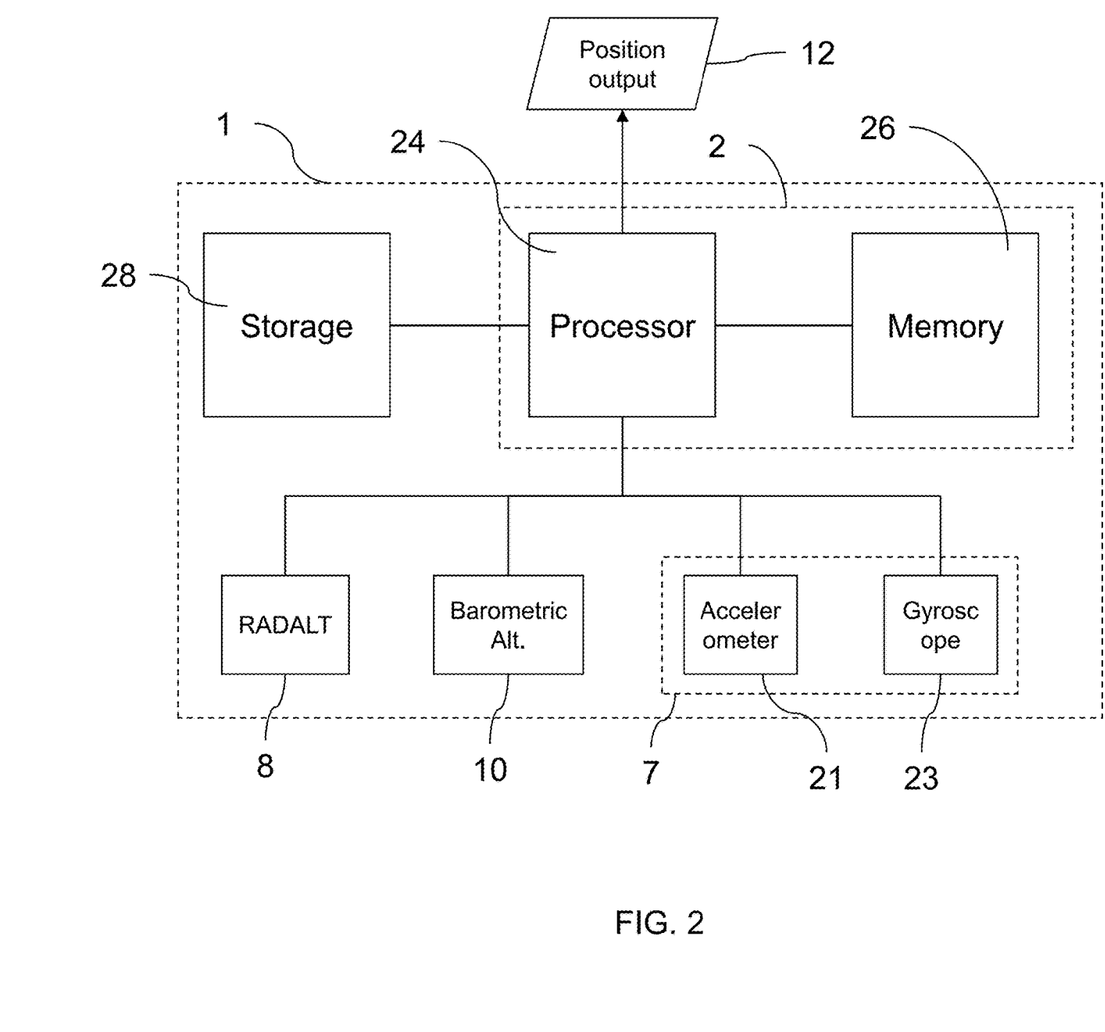
FIG. 2 shows a schematic block diagram illustrating the hardware components of a navigation system in accordance with the present disclosure.

FIG. 2 is a schematic block diagram illustrating the hardware components of the navigation system 1. Shown are a processor 24, coupled to a memory 26 (e.g. by a memory bus), which make up the hardware components of the IAU 2. The processor 24 may comprise any suitable processing hardware, for example a central processing unit (CPU), a field-programmable gate array (FPGA), etc. The memory 26 may comprise any suitable computer-readable memory, for example random access memory (RAM) Flash memory, etc. In this example, the processor 24 and memory 26, as well as performing the functions of the IAU 2, also perform the functions of the land-water calculation unit 6 shown in FIG. 1. The processor 24 is arranged to update the system error state and position estimate, as described previously with reference to the IAU 2 and FIG. 1, and output the current position estimate to the position output 12, which may communicated to a further system of the vehicle to which the navigation system 1 is attached (e.g. a navigation display).

Also coupled to the processor 24 is the storage 28 (e.g. by a memory bus). Stored within the storage 28 is the terrain elevation map 4. The storage 28 may comprise any suitable non-volatile computer memory, including but not limited to a hard-disk drive (HDD), solid state drive (SSD), etc. The storage 28 outputs terrain elevation data to the processor 24, allowing the processor 24 to perform its functions both as the IAU 2 and the land-water calculation unit 6.

Also coupled to the processor 24 are the INS 7, which in this example comprises three orthogonal accelerometers 21 and three orthogonal gyroscopes 23, the radar altimeter 8, and the barometric altimeter 10. The operation of the radar altimeter 8, barometric altimeter and INS 7 are described above in further detail with reference to FIG. 1.

Figure 3:
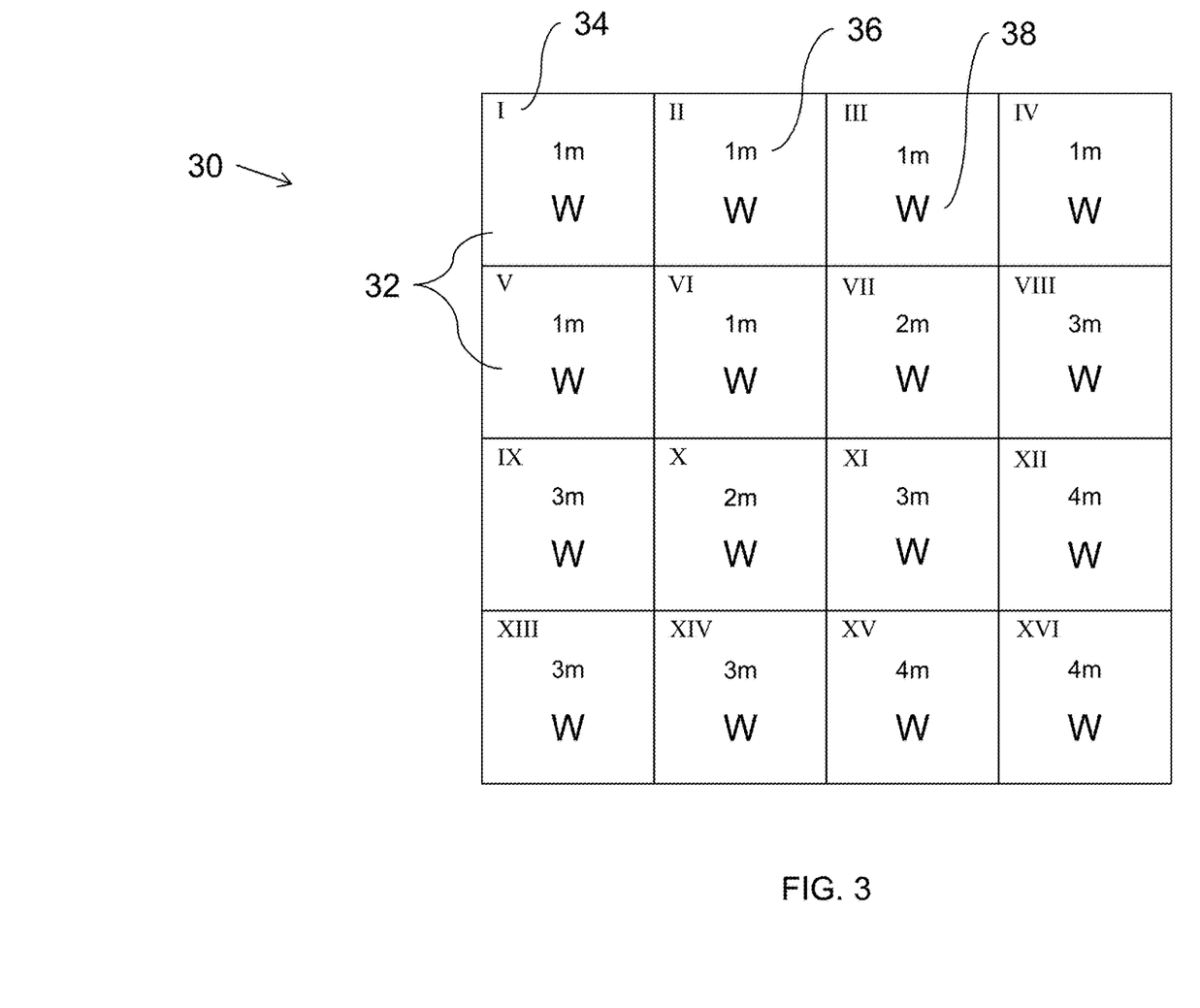
FIG. 3 shows a visualisation of a portion of a terrain elevation map after a first stage of a land/water classification process in accordance with the present disclosure.
Figure 4:
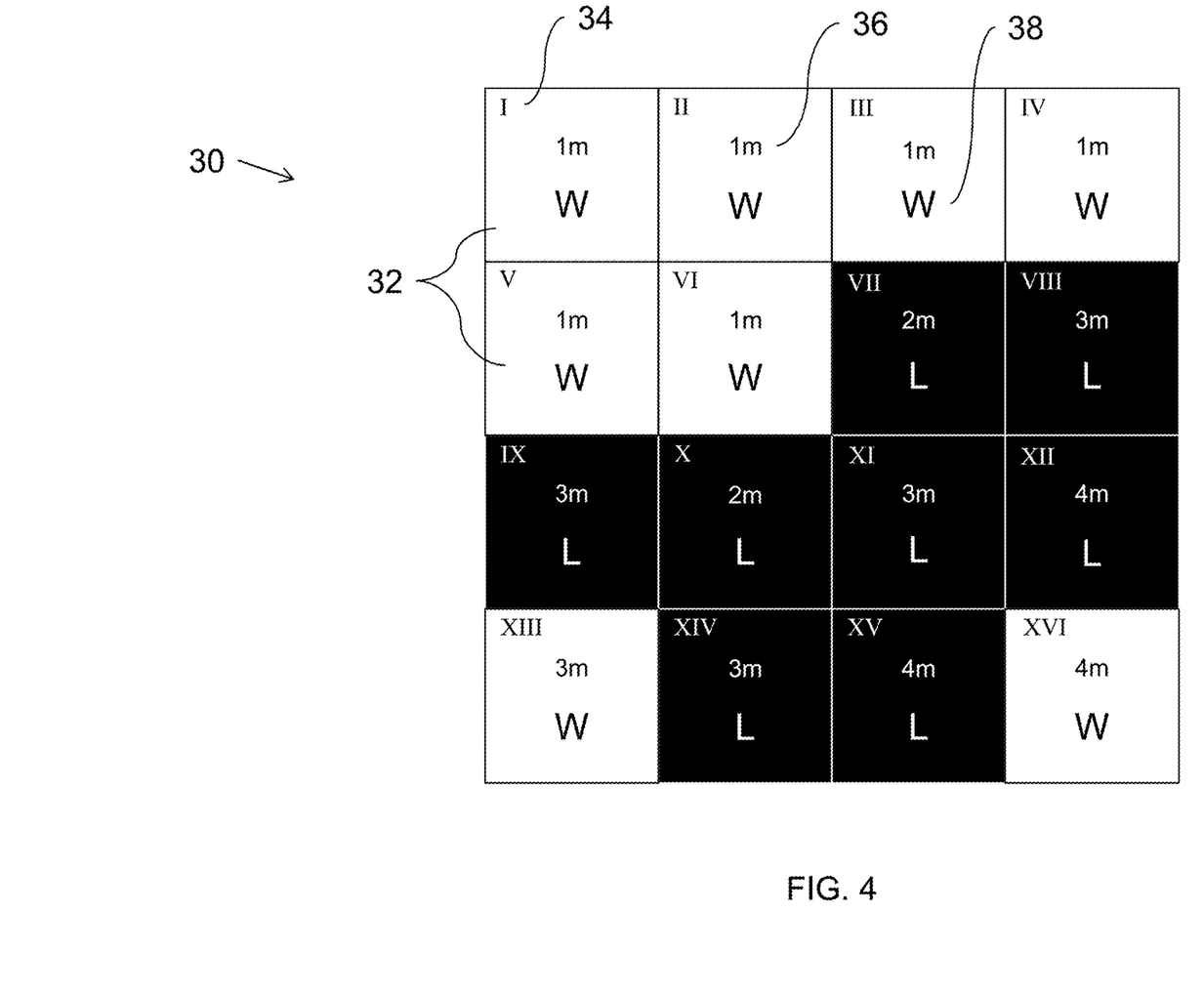
FIG. 4 shows a visualisation of a portion of a terrain elevation map after a second stage of a land/water classification process in accordance with the present disclosure.
Figure 5:
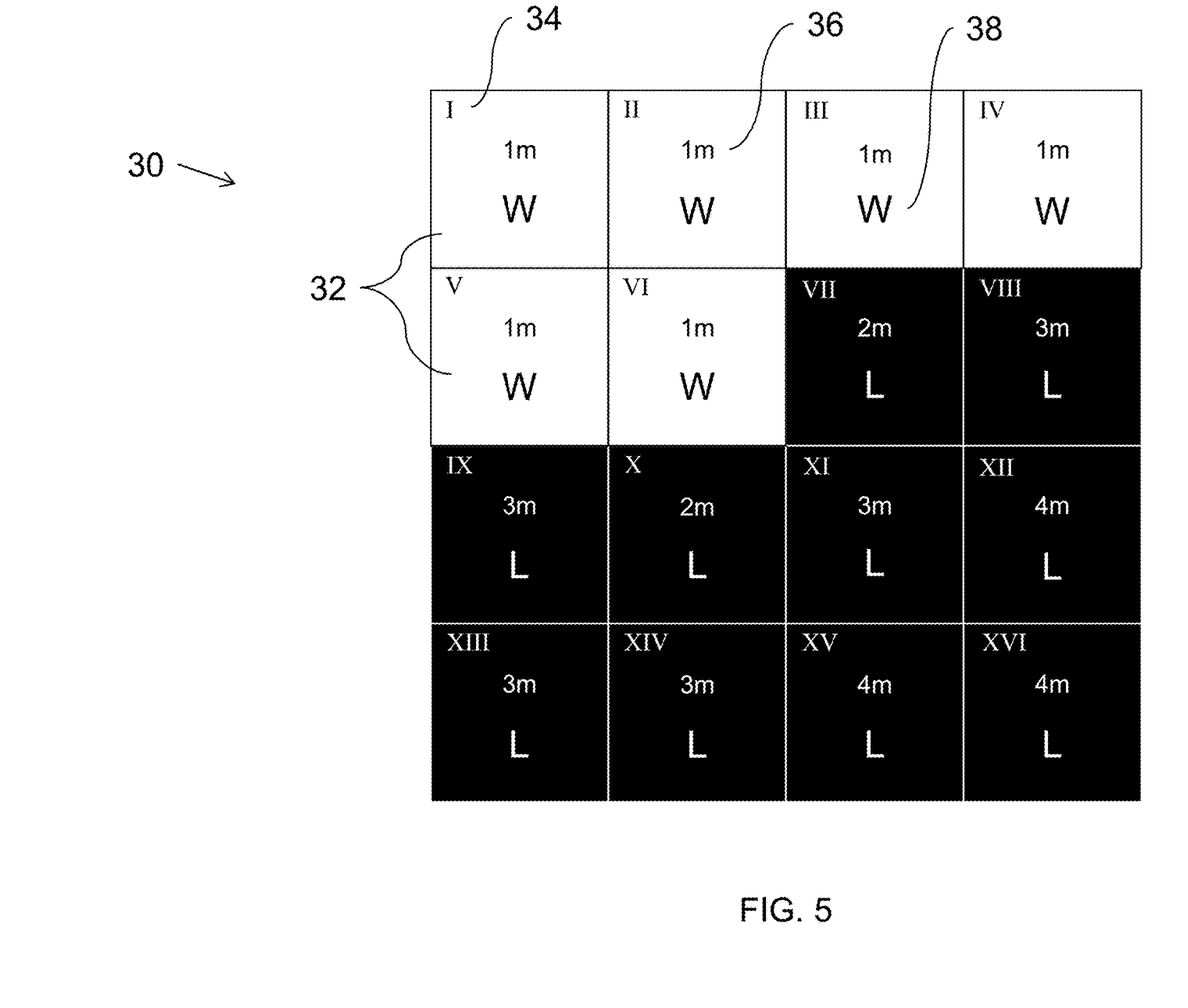
FIG. 5 shows a visualisation of a portion of a terrain elevation map after a second stage of a land/water classification process in accordance with the present disclosure.

The operation of the land-water calculation unit 6 will now be described in detail with reference to FIGS. 3 to 5, which illustrate the three main stages by which the land-water calculation unit 6 is arranged to classify map posts within a portion of the terrain map 4 as being probably land, or probably water. FIG. 3 shows a visualisation of a portion 30 of the terrain elevation map 4. It will be appreciated that the terrain elevation map 4 is not actually a visual map as shown in FIGS. 3 to 5, but in reality comprises a plurality of data entries (map posts), each corresponding to a particular area on the Earth's surface and each comprising an elevation of the terrain for that area. The portion 30 of the terrain map 4 shown in FIGS. 3 to 5 is illustrative only, and provided in order to aid understanding of the operation of the land-water calculation unit 6.

The portion 30 of the terrain map 4 comprises sixteen map posts 32 arranged in a square. Each map post 32 comprises an arbitrary label 34 in order to aid the forthcoming description, each label 34 comprising a roman numeral from I to XVI, an elevation value 36, in metres, and a land/water label 38, which may comprise a 'W' to indicate that the corresponding map post is labelled as water, or an 'L' to indicate that the corresponding map post is labelled as land. In this example, the portion 30 comprises an arbitrary portion of the terrain map 4, however in normal operation of the navigation system 1, the portion of the terrain map 4 on which the following operation is carried out comprises a cache of the local terrain elevation data 14 surrounding the current estimated position 22 of the vehicle. The cache of the local terrain elevation data 14 is updated continually to follow the estimated position of the vehicle as it changes over time, and to allow the land-water calculation unit 6 and IAU 2 to have quick and efficient access to the local terrain elevation data 14.

FIG. 3 illustrates the first stage in the process by which the land-water calculation unit 6 classifies the map posts 32 within the portion 30 of the terrain map 4 as being probably land, or probably water. This process operates on the principle that terrain elevation data for a body of water is typically the local minimum of terrain elevation data within a given portion of a terrain map 4, and that areas of land that are adjacent to the body of water are thereby at a higher elevation. Initially, the land-water calculation unit 6 classifies all map posts 32 of the portion 30 as water, as indicated by the labels 38 of FIG. 3 (each of which are labelled 'W').

FIG. 4 illustrates the second stage in the land/water classification process. During this stage, the land-water calculation unit 6 changes the classification from water to land of all map posts 32 within the portion 30 which have an adjacent map post at a lower elevation. In this example, the land-water calculation unit 6 classifies map posts VII, VIII, IX, X, XI, XII, XIV and XV as land (indicated by the black colour, and the label 'L'), as each of these has an adjacent map post at a lower elevation. For example, map post VII (which has an elevation of 2 m) is adjacent to map posts III and VI (both of which have an elevation of 1 m). The elevation of map posts III and VI is therefore less than that of map post VII, and therefore the land-water calculation unit 6 changes the label of map post VII to land.

FIG. 5 illustrates the third stage in the land/water classification process. During this stage, the land-water calculation unit 6 classifies all map posts 32 within the portion 30 as land which have an adjacent map post 32 at the same elevation which is already labelled as land. In this example, the land-water calculation unit 6 does this repeatedly—that is over a series of repeated passes until a pass is completed in which the labels of no map posts 32 are changed, at which point the land-water calculation unit 6 ceases the land/water classification process. This operation is performed repeatedly as each pass in which a label of a map post 32 is changed from water to land requires a further pass to be completed in order to make sure that the change has not enabled further map posts 32 to have their labels changed from water to land.

In the example shown in FIG. 5, two passes are completed. In the first pass, the land-water calculation unit 6 changes the label of map posts XIII and XVI to land, as both of these map posts are adjacent to at least one map post at the same elevation that has already been labelled as land. For example, map post XIII is adjacent to map posts IX and XIV, both of which were labelled as land during the second stage of the land/water classification process (shown in FIG. 2) and both of which have the same elevation (3 m) as map post XIII. Similarly, map post XVI is adjacent to map posts XII and XV at the same height of 4 m. In the second pass, the land-water calculation unit does not change the labels of any of the map posts 32 within the portion 30, as there are no remaining map posts that are not already labelled as land that have an adjacent map post at the same elevation which is already labelled as land. Therefore, after the second pass, the land-water calculation unit 6 determines that the land/water classification process for this portion 30 of the terrain map 4 is completed.

The land-water calculation unit 6 is then arranged to calculate and output a proportion 16 of map posts 32 that are labelled as land for a subset of the portion of map posts 32 for which the land/water classification process has been performed (which in this example comprises the cached portion of the terrain elevation map 4). During normal operation of the navigation system 1, the land-water calculation unit 6 calculates the proportion 16 of map posts 32 that are labelled as land of a subset of the cached portion of the terrain elevation map 4, the subset corresponding to an area surrounding the current position estimate 22. The subset may be a predetermined number of map posts 32 corresponding to an area centred on the current position estimate 22, or it may be a dynamic number of map posts 32 corresponding to an area centred on the current position estimate 22, the number of map posts 32 (and therefore the size of the corresponding area) being dependant on the current estimated uncertainty in the current position estimate 22. For example, if the estimated uncertainty in the current position estimate 22 is large, the subset of the cached portion which the land-water calculation unit 6 uses to calculate the proportion 16 may be increased in size accordingly.

In this example, the IAU 2 is arranged to apply a Q-boost to the height bias state when the proportion 16 of map posts 32 that are labelled as land, as output by the land-water calculation unit 6, is between 5% and 95% for the subset of the cached portion of the terrain map 4. If the proportion 16 of map posts 32 that are labelled as land for the local portion (i.e. subset) of the terrain map 4 is between 5% and 95%, this indicates that the vehicle is over a transition between land and water, and therefore that the IAU 2 should take this into account when updating the system error state and the position estimate.

Applying a Q-boost to the height bias state in this way causes the IAU 2 to increase the uncertainty associated with the height bias state. This causes the IAU 2 to reduce the weight applied to the height bias state when updating the system error state and the position estimate 22, and thus helps reduce the effect of errors that result from passing over areas containing transitions from land to water (as explained previously).

Examples of this disclosure thus provide an improved terrain referenced navigation system by providing the ability to detect and account for transitions between land and water when a vehicle passes over these.

The invention claimed is:

1. A terrain referenced navigation system for a vehicle, comprising:
    at least one sensor arranged to measure the elevation of terrain below a current position of the navigation system;
    a terrain elevation map comprising a plurality of map posts that each comprise terrain elevation data comprising terrain elevation values;
    a land-water detection unit arranged to calculate a proportion of land and/or water of at least a portion of the terrain elevation map based on the terrain elevation values of the terrain elevation data of said portion of the terrain elevation map; and
    an iterative algorithm unit arranged to determine a position estimate of the navigation system and thus the vehicle and output the position estimate to a further system of the vehicle, wherein in each iteration the iterative algorithm unit is arranged to:
    receive the measured terrain elevation data;
    receive the proportion of land and/or water of at least a portion of the terrain elevation map from the land-water detection unit;
    determine whether the current position estimate of the navigation system is over a land-water transition based on the proportion of land and/or water received from the land-water detection unit; and
    update the position estimate for the next iteration based on the current position estimate, the measured terrain elevation data, the stored terrain elevation data and whether the current position estimate of the vehicle is over a land-water transition;
    wherein the iterative algorithm unit is arranged to apply a Q-boost to a height state of the iterative algorithm unit when the iterative algorithm unit determines that the navigation system is located above a land-water transition;
    wherein the Q-boost applied to the height state is equal to a predetermined amount; and
    wherein the predetermined amount is greater than $(0.5\ m)^2$, and wherein the position next iteration is based on the Q-boost.

2. The navigation system of claim 1, wherein the iterative algorithm unit is arranged to update the position estimate for the next iteration based on a correlation between measured terrain elevation data and stored terrain elevation data in the terrain elevation map.

3. The navigation system of claim 1, further comprising an inertial navigation system and wherein the iterative algorithm unit is arranged to update the position estimate for the next iteration further based on the signal(s) output by the inertial navigation system.

4. The navigation system of claim 1, wherein the iterative algorithm unit is arranged to increase an uncertainty associated with the measured terrain elevation data when the iterative algorithm unit determines that the navigation system is located above a land-water transition.

5. The navigation system of claim 1, wherein the land-water detection unit is arranged to classify each map post as land or water for a portion of the terrain elevation map, the process of classifying each map post as land or water comprising:
    initially labelling as water all map posts within the portion of the terrain elevation map;
    changing to land the labels of all map posts that have an adjacent map post at a lower elevation in a first pass of the map posts within the portion of the terrain elevation map; and
    in repeated passes changing to land the labels of all map posts that have an adjacent map post at the same elevation that is labelled as land, ceasing at the end of the first pass that results in no labels being changed.

6. The navigation system of claim 1, wherein the land-water detection unit is arranged to:
    classify each map post as land or water for a first portion of the terrain elevation map corresponding to a predetermined area surrounding the current position estimate; and
    calculate a proportion of land and/or water of a second portion of the terrain elevation map corresponding to a second area surrounding the current position estimate, wherein the second portion of the terrain elevation map is a subset of the first portion of the terrain elevation map.

7. The navigation system of claim 6, wherein the first portion of the terrain elevation map comprises a cache of a predetermined number of map posts surrounding the current position estimate, and the size of the second portion of the terrain elevation map is dependent upon the uncertainty in the current position estimate.

8. The navigation system of claim 7, wherein the iterative algorithm unit is arranged to determine that the navigation system is located above a land-water transition when the proportion of map posts within the second portion of the terrain elevation map that are labelled as land lies above a first predetermined threshold and below a second predetermined threshold, and to determine that the navigation is not located above a land-water transition when the proportion of said map posts that are labelled as land does not lie above said first predetermined threshold and below said second predetermined threshold.

9. The navigation system of claim 8, wherein the first predetermined threshold is less than or equal to 5%, and the second predetermined threshold is greater than or equal to 95%.

10. The navigation system of claim 1, wherein the iterative algorithm unit is a Kalman filter.

11. The navigation system of claim 1, wherein the further system of the vehicle comprises at least one of: a navigation display, an autopilot system, or a flight recording system.

12. A method of determining a position estimate of a navigation system for a vehicle, the method comprising:
  receiving a plurality of map posts that each comprise terrain elevation data comprising terrain elevation values for at least a portion of a terrain elevation map;
  initially labelling as water all map posts within the portion of the terrain elevation map;
  changing to land the labels of all map posts that have an adjacent map post at a lower elevation;
  changing to land the labels of all map posts that have an adjacent map post at the same elevation that is labelled as land;
  calculating a proportion of land to water of the portion of the terrain elevation map by calculating the proportion of map posts that are labelled as land and/or water within the portion of the terrain elevation map; and
  iteratively determining a position estimate of the navigation system with an iterative algorithm unit and outputting the position estimate to a further system of the vehicle, wherein determining the position estimate comprises, in each iteration:
    receiving measured terrain data from a sensor arranged to measure the elevation of terrain below a current position of the navigation system;
    receiving the calculated proportion of land to water of the portion of the terrain elevation map;
    determining whether a current position estimate of the navigation system is over a land-water transition based on the received proportion of land to water; and
  updating the position estimate for the next iteration based on the current position estimate, the measured terrain elevation data, the stored terrain elevation data and whether the current position estimate of the vehicle is over a land-water transition;
  wherein the iterative algorithm unit is arranged to apply a Q-boost to a height state of the iterative algorithm unit when the iterative algorithm unit determines that the navigation system is located above a land-water transition;
  wherein the Q-boost applied to the height state is equal to a predetermined amount; and
  wherein the predetermined amount is greater than $(0.5 \text{ m})^2$, and wherein the position next iteration is based on the Q-boost.

13. The method of claim 12, wherein the further system of the vehicle comprises at least one of: a navigation display, an autopilot system, or a flight recording system.

* * * * *